United States Patent [19]

Spencer et al.

[11] Patent Number: 5,798,314

[45] Date of Patent: *Aug. 25, 1998

[54] SUPPORTED OLEFIN POLYMERIZATION CATALYST

[75] Inventors: Lee Spencer, Pearland; Marc A. Springs, Angleton, both of Tex.

[73] Assignee: The Dow Chemical Company, Midland, Mich.

[*] Notice: The portion of the term of this patent subsequent to Aug. 26, 2014, has been disclaimed.

[21] Appl. No.: 657,572

[22] Filed: Jun. 4, 1996

Related U.S. Application Data

[63] Continuation-in-part of Ser. No. 289,992, Aug. 12, 1994, Pat. No. 5,661,097.

[51] Int. Cl.$^6$ .................................................. B01J 31/00
[52] U.S. Cl. .................. 502/115; 502/116; 502/233; 502/235; 502/238; 502/439
[58] Field of Search ........................ 502/115, 116, 502/233, 235, 238, 439

[56] References Cited

U.S. PATENT DOCUMENTS

| | | | |
|---|---|---|---|
| 2,457,970 | 1/1949 | Bailie. | |
| 3,607,777 | 9/1971 | Winyaii et al.. | |
| 3,787,384 | 1/1974 | Stevens et al.. | |
| 4,136,058 | 1/1979 | Harris et al.. | |
| 4,244,838 | 1/1981 | Gessell. | |
| 4,246,383 | 1/1981 | Gessell. | |
| 4,263,168 | 4/1981 | Rochefort et al.. | |
| 4,301,029 | 11/1981 | Caunt et al.. | |
| 4,324,691 | 4/1982 | Hartshorn et al.. | |
| 4,387,200 | 6/1983 | Gessell et al.. | |
| 4,405,495 | 9/1983 | Lee et al.. | |
| 4,426,316 | 1/1984 | Gessell. | |
| 4,481,301 | 11/1984 | Nowlin et al.. | |
| 4,496,660 | 1/1985 | Gessell et al.. | |
| 4,499,198 | 2/1985 | Pullukat et al.. | |
| 4,508,843 | 4/1985 | Etherton et al.. | |
| 4,526,943 | 7/1985 | Fuentes et al.. | |
| 4,618,596 | 10/1986 | Agapiou et al. | 502/116 |
| 4,639,430 | 1/1987 | Pasquet et al.. | |
| 4,701,506 | 10/1987 | Agapiou et al. | 526/128 |
| 4,935,394 | 6/1990 | Chang | 502/104 |
| 5,034,365 | 7/1991 | Buehler et al. | 502/119 |
| 5,064,798 | 11/1991 | Chang | 502/111 |
| 5,064,799 | 11/1991 | Monte et al.. | |
| 5,114,897 | 5/1992 | Schell et al.. | |
| 5,139,985 | 8/1992 | Barbé et al.. | |
| 5,143,883 | 9/1992 | Buehler et al. | 502/119 |
| 5,145,821 | 9/1992 | Buehler et al. | 502/119 |
| 5,155,079 | 10/1992 | Cribbs et al. | 502/113 |
| 5,221,650 | 6/1993 | Buehler | 502/104 |
| 5,227,439 | 7/1993 | Luciani et al.. | |
| 5,232,998 | 8/1993 | Buehler et al. | 526/125 |
| 5,244,854 | 9/1993 | Noristi et al.. | |
| 5,275,991 | 1/1994 | Buehler et al. | 502/107 |
| 5,278,117 | 1/1994 | Luciani et al.. | |
| 5,346,872 | 9/1994 | Menon et al. | 502/116 |
| 5,369,194 | 11/1994 | Cribbs et al. | 526/116 |

*Primary Examiner*—Elizabeth D. Wood

[57] ABSTRACT

A supported catalyst component for an olefin polymerization catalyst consisting essentially of a solid particulate support and a magnesium halide; and an olefin polymerization catalyst consisting essentially of a solid particulate support and a magnesium halide, a Group 4 or 5 transition metal compound, and a Group 2 or 13 organometallic compound, and wherein a majority of particles of the solid particulate support are in the form of an agglomerate of subparticles.

7 Claims, No Drawings

SUPPORTED OLEFIN POLYMERIZATION CATALYST

CROSS-REFERENCE TO RELATED APPLICATION

This application is a continuation-in-part of application Ser. No. 08/289,992 filed Aug. 12, 1994, and now U.S. Pat. No. 5,661,097, all of which is incorporated herein by reference.

BACKGROUND OF THE INVENTION

This invention relates to a supported catalyst component, to a process for preparing such a supported catalyst component, to an olefin polymerization supported catalyst composition, and to an olefin polymerization process using such a supported catalyst.

Supported catalysts of the so-called Ziegler or Ziegler-Natta type can be used in the polymerization of olefins in high pressure, solution, gas phase, and suspension or slurry processes. In typical slurry and gas phase processes the polymeric products are obtained as solid particles. In such processes small polymer particles or a large particle size distribution should be avoided, as buildup of small particles can cause entrainment problems in the reactor, valves or transfer lines. Further, low polymer bulk densities cause difficulties in operations where gravity feed is required, such as transfer to extruders, and increase the volume required for powder storage or shipping containers.

U.S. Pat. No. 4,526,943 discloses an olefin polymerization catalyst prepared by the reaction of a hydrocarbon soluble organomagnesium compound with a trialkylaluminum and an aliphatic alcohol to generate a soluble magnesium alkoxide precursor to which is added a transition metal compound, typically a titanium compound. A supported catalyst is then prepared by precipitation of a magnesium halide using a reducing metal halide, such as ethylaluminum dichloride. These supported catalysts can achieve high efficiencies on a transition metal basis and yield polymer powder of the desired particle size and bulk density, yet the high levels of alkylaluminum halide required to precipitate the catalyst results in relatively high levels of aluminum and chloride in the final polymer. In addition, alcohol is generated as a by-product of typical catalyst deactivation procedures, which alcohol is difficult to remove from solvent recycle streams and requires expensive separation and purification procedures.

Other efforts to control catalyst efficiencies and polymer morphology for Ziegler-type catalysts focused on supporting typical Ziegler catalysts containing a transition metal compound and a magnesium halide on metal oxides such as silica and alumina or polymer supports.

U.S. Pat. No. 4,639,430 describes a catalyst support consisting essentially of a mixture of silica and a magnesium chloride, said support having a porous texture and containing less than 100 micromoles of hydroxyl groups per gram of support, as well as olefin polymerization catalysts consisting essentially of such supports and at least one active component of a group IV, V or VI halide.

U.S. Pat. No. 4,405,495 describes the pretreatment of a particulate silica support having a particle size distribution of from 2 to 80 microns and an average particle size of from 20 to 50 microns with a precursor compound containing magnesium, titanium, halo, electron donor and optionally a hydrocarbyloxy or carboxylate group. The support can be pretreated with an aluminum alkyl. The precursor is dissolved in the electron donor and impregnated on the silica support.

U.S. Pat. No. 4,301,029 describes the preparation of a catalyst component by reacting a solid inorganic support with a magnesium hydrocarbyl compound, a halogenating agent, a Lewis base compound and titanium tetrachloride. Preferably after each step the product is washed and separated.

U.S. Pat. No. 4,324,691 describes the preparation of a catalyst component by reacting a particulate support material, preferably first with an aluminum compound, then with an organomagnesium compound, a transition metal compound, and a pacifying agent such as hydrogen chloride, and optionally an organometallic compound, a halogenating agent or a Lewis base.

U.S. Pat. No. 4,481,301 discloses the preparation of a supported olefin polymerization catalyst by treating a solid porous carrier in a liquid medium with an organomagnesium compound to react with the OH groups on the carrier, evaporating said liquid medium to precipitate magnesium onto the carrier and recovering a supported magnesium composition in the form of a dry, free-flowing powder. The powder is reacted with a tetravalent titanium compound in a liquid medium.

U.S. Pat. No. 3,787,384 discloses the preparation of supported catalyst components by impregnating a metal oxide such as silica or alumina, with an organometallic magnesium compound, selected in particular from magnesium alkyl and Grignard compounds, and reacting the obtained product with a titanium halide compound.

U.S. Pat. No. 4,263,168 describes catalyst components for the polymerization of propylene and other alpha-olefins, obtained by reacting a metal oxide, such as silica or alumina, containing hydroxyls on the surface, with an organometallic magnesium compound of the formula $MgR_{2-x}X_x$ (where R is a hydrocarbon radical; X is halogen; x is a number from 0.5 to 1.5), and subsequent reaction with an electron-donor compound and titanium tetrachloride. As a variant, the metal oxide, either before or after the reaction with the organometallic magnesium compound, can be reacted with a halogenating agent which will supply at least one halogen per hydroxyl group.

U.S. Pat. No. 5,139,985 describes catalyst components obtained by supporting a magnesium dihalide or a magnesium compound which can then be transformed to dihalide on a porous polymer support, and reacting this solid with a titanium halide or titanium halogen alcoholate, optionally in the presence of an electron-donor compound.

U.S. Pat. No. 5,064,799 describes catalyst components obtained from the reaction of a tetravalent titanium halide and an electron-donor compound with a solid obtained by reacting a metal oxide containing surface hydroxyl groups (such as silica or alumina) with an organometallic magnesium compound of the formula $MgR_{2-x}X_x$, where R is a hydrocarbon radical, X is a halogen or an OR or COX' radical (where X' is halogen) and x is a number from 0.5 to 1.5, used in amounts such as not to cause reduction of titanium during the subsequent reaction of the solid with the titanium halide.

U.S. Pat. No. 5,227,439 describes a solid catalyst component obtained by preparing a solution of magnesium chloride in ethanol, impregnating activated silica particles with this solution, adding to this suspension a titanium compound and silicon halide, eliminating the ethanol to recover a solid, reacting the solid with alkyl aluminum chloride, and recovering the solid catalyst component.

U.S. Pat. No. 5,244,854 describes a catalyst component for the polymerization of olefins obtained by reacting a

3 tetravalent titanium halide or titanium halogen alcoholate and an electron donor compound with a solid comprising a porous metal oxide containing surface hydroxyl groups, on which is supported a magnesium dihalide or a magnesium compound which can be converted to a magnesium dihalide.

U.S. Pat. No. 5,278,117 describes a supported Ziegler-Natta catalyst consisting of a cocatalyst and a solid catalyst component obtained by impregnating a granular porous solid support with a solution of magnesium chloride and a titanium tetraalcoholate in a liquid aliphatic hydrocarbon, evaporation of the solvent, impregnation with a solution of magnesium chloride in an aliphatic ester, evaporation of the solvent, and activation with an alkyl aluminum chloride.

It is desired to provide a supported catalyst component and a supported catalyst which can be used in olefin polymerization processes, in particular in slurry or gas phase type processes, to give olefin polymers with desired morphology and bulk density at high catalyst efficiencies. It would further be desirable to provide a supported catalyst component which is storage stable.

SUMMARY OF THE INVENTION

The present invention is based on the insight that certain physical characteristics of the solid support, especially an agglomerated structure of the solid support particles, enables the preparation of solid polymer particles having the desired morphology and bulk density.

Accordingly, the present invention provides a supported catalyst component comprising (A) a solid particulate support having (i) a specific surface area of from 100 to 1000 square meters per gram ($m^2/g$), (ii) a surface hydroxyl content of not more than 5 millimoles (mmol) hydroxyl groups per gram (g) of solid support, (iii) a pore volume of from 0.3 to 3.0 cubic centimeters per gram (cc/g), (iv) a median particle size of 1 to 200 microns ($\mu m$), and (v) a majority of particles of the solid particulate support in the form of an agglomerate of subparticles, and (B) a magnesium halide.

According to a further aspect the present invention provides a process for preparing a supported catalyst component comprising the steps of:

impregnating a solid particulate support (A) having (i) a specific surface area of from 100 to 1000 $m^2/g$, (ii) a surface hydroxyl content of not more than 5 mmol hydroxyl groups per g of solid support, (iii) a pore volume of from 0.3 to 3.0 cc/g, (iv) a median particle size of 1 to 200 $\mu m$, and (v) a majority of particles of the solid particulate support in the form of an agglomerate of subparticles, with a solution of a magnesium halide (B) or with a solution of a magnesium compound (B') which can be transformed into magnesium halide (B) by halogenation;

when a magnesium compound (B') is used, halogenating the magnesium compound (B') to magnesium halide with a halogenating agent (C); and optionally, recovering the supported catalyst component.

In another aspect the present invention provides an olefin polymerization supported catalyst composition comprising a supported catalyst component comprising (A) a solid particulate support having (i) a specific surface area of from 100 to 1000 $m^2/g$, (ii) a surface hydroxyl content of not more than 5 mmol hydroxyl groups per g of solid support, (iii) a pore volume of from 0.3 to 3.0 cc/g, (iv) a median particle size of 1 to 200 $\mu m$, and (v) a majority of particles of the solid particulate support in the form of an agglomerate of subparticles, (B) a magnesium halide, (D) a Group 4 or 5 transition metal compound, (E) a Group 2 or 13 organometal compound, and, optionally, an electron-donor (F), and a cocatalyst selected from the group consisting of alumoxanes and compounds corresponding to the formula $R''_zGX''_{3-z}$, wherein G is aluminum or boron, R" independently each occurence is hydrocarbyl, X" independently each occurence is halide or hydrocarbyloxide, and z is a number from 1 to 3.

According to a further aspect the present invention provides an olefin polymerization process comprising contacting one or more olefins under olefin polymerization conditions with an olefin polymerization catalyst composition comprising a supported catalyst component comprising (A) a solid particulate support having (i) a specific surface area of from 100 to 1000 $m^2/g$, (ii) a surface hydroxyl content of not more than 5 mmol hydroxyl groups per g of solid support, (iii) a pore volume of from 0.3 to 3.0 cc/g, (iv) a median particle size of 1 to 200 $\mu m$, and (v) a majority of particles of the solid particulate support in the form of an agglomerate of subparticles, (B) a magnesium halide, (D) a Group 4 or 5 transition metal compound, (E) a Group 2 or 13 organometal compound, and, optionally, an electron-donor (F), and a cocatalyst selected from the group consisting of alumoxanes and compounds corresponding to the formula $R''_zGX''_{3-z}$, wherein G is aluminum or boron, R" independently each occurence is hydrocarbyl, X" independently each occurence is halide or hydrocarbyloxide, and z is a number from 1 to 3.

BRIEF DESCRIPTION OF THE DRAWINGS

The drawing shows electron micrographs of cross sections of two agglomerated particulate supports used in the present invention, one of 45 $\mu m$ median particle size (designated as solid support 45A) at a magnification of 1000 times (FIG. 1) and one of 70 $\mu m$ median particle size (designated as solid support 70A) at a magnification of 500 times (FIG. 2). These micrographs show that the solid support particles consist of sub-particles generating voids in the support particles.

DETAILED DESCRIPTION OF THE INVENTION

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups. The term hydrocarbyl as employed herein means any aliphatic, cycloaliphatic, aromatic group or any combination thereof. The term hydrocarbyloxy means a hydrocarbyl group having an oxygen linking between it and the element to which it is attached.

Surprisingly, it has been found that employing a solid particulate support having the characteristics (A)(i)–(v) as mentioned hereinbefore, provides a supported catalyst composition having excellent properties in both catalytic efficiency and in providing polymers of the desired morphology and high bulk density. As will be shown in the comparative examples a solid support having characteristics (A)(i)–(iv), but lacking characteristic (A)(v) does not give a supported catalyst having the desired properties.

As used in the present invention the term "agglomerate of sub-particles" in reference to the texture of a support particle means that such a support particle is composed of more than one sub-particle. This phenomenon of agglomerated particles can be observed from electron micrographs of the support particles. Typical particle sizes of the sub-particles are from less than 1 μm to about 10 μm. Alternatively, an agglomerate of sub-particles can be characterized by its content of voids existing between the sub-particles. The void fraction as used in the present invention is determined from electron micrographs of cross-sections of support particles according to the following procedure.

All the electron micrographs were generated on a JSM-6400 scanning electron microscope (JEOL USA, Inc.). The images used for void fraction determination were acquired using backscattered electrons. A primary beam energy of 20 keV was used for the larger support particles, however, at the higher magnifications used to image the smallest supports, the resolution of 20 keV electrons was not sufficient. Therefore, a primary beam energy of 10 keV was used for the 6 micron supports. Image analysis was performed on a quantimet 570 (Leica, Inc.). Electron micrographs were imported into the image analyzer through a CCD video camera. Particles were detected by grey level thresholding to produce binary images. Any errors of omission of inclusion caused by the thresholding process were manually corrected by the operator. Percent void analysis was accomplished by determining the area of the images occupied by solid support and the area occupied by solid support plus void in cross sections through support particles. The area occupied by solid support plus void was determined from the same binaries used to measure the area occupied by silica after these binaries had undergone closing operations (J. Serra, Image Analysis and Mathematical Morphology, Vol. 1, p. 50, Academic Press (1982)) sufficient to cover all internal voids. Percent void was then determined using the following equation:

void fraction=100*(1−area of solid support/closed area)

For cross sectioning, the support particles were vacuum embedded in Epo-Thin (Buehler) and allowed to cure overnight at room temperature. Cross sections were created by grinding and polishing with 120 grit and 600 grit silicon carbide, 6 μm diamonds, and 0.3 μm alumina. These mounts were slightly coated (about 4 nm) with gold:palladium alloy by sputtering.

Typical void fractions of agglomerated sub-particles determined according to this procedure range from 5 to 30 percent, preferably from 10 to 25 percent.

The agglomerates of subparticles, or in other words the support particles, have a shape which is substantially more spherical than so-called granular support particles.

As used in the present invention:

the specific surface area means the specific surface area determined by nitrogen adsorption using the B.E.T. technique as described by S. Brunauer, P. Emmett, and E. Teller in Journal of the American Chemmical Society, 60, pp. 209–319 (1939);

the median particle size and particle size distribution are determined with a Coulter counter particle size analyzer as described in Particle Characterization in Technology Vol 1, Applications and Microanalysis, pp. 183–186, ed. J. K. Beddow, CRC Press, Boca Naton, Fla., 1984;

the hydroxyl content means the hydroxyl content as determined by adding an excess of dialkyl magnesium to a slurry of the solid support and determining the amount of dialkyl magnesium remaining in solution via known techniques. This method is based on the reaction of $S\text{---}OH + MgR_2 \rightarrow S\text{---}OMgR + RH$, wherein S is the solid support. These hydroxyl (OH) groups, where the support is silica, derive from silanol groups on the silica surface; and the pore volume means the pore volume as determined by nitrogen adsorption.

Preferably, in the solid particulate support (A)(v) at least 70 percent by weight, more preferably at least 90 percent of the solid particulate support is in the form of an agglomerate of subparticles.

The solid particulate support (hereinafter also referred to as solid support) generally has (i) a specific surface area of from 100 to 1000 m$^2$/g, (ii) a surface hydroxyl content of not more than 5 mmol hydroxyl groups per g of solid support, (iii) a pore volume of from 0.3 to 3.0 cc/g, and (iv) a median particle size of 1 to 200 μm. When the specific surface area and pore volume are too low, this will lead to low catalyst efficiency. Further, the amount of magnesium halide that can be supported on the support is dependent on the specific surface area of the support, the lower the specific surface area, the less magnesium halide can be supported resulting in a lower catalyst efficiency. The hydroxyl content should be as low as possible. Too high hydroxyl content lowers the catalyst efficiency. The particle size is also related to the catalyst efficiency: the smaller the particle size, the higher the efficiency. Optimum particle sizes depend on the end use of the catalyst component, as discussed hereafter. Preferably, the solid support has (i) a specific surface area of from 200 to 600 m$^2$/g, (ii) a surface hydroxyl content of from 0.5 to not more than 3 mmol hydroxyl groups per g of solid support, (iii) a pore volume of from 0.5 to 2.5 cc/g, (iv) a median particle size of 3 to 150 μm.

Examples of suitable support materials include solid inorganic oxides, such as silica, alumina, magnesium oxide, titanium oxide, thorium oxide, and mixed oxides of silica and one or more Group 2 or 13 metal oxides, such as silica-magnesia, silica-alumina mixed oxides. Silica, alumina, and mixed oxides of silica and one or more Group 2 or 13 metal oxides are the preferred support materials. Preferred examples of such mixed oxides are the silica-aluminas containing a high amount of silica, such as zeolites and zeolites subjected to a dealumination treatment to increase the silica/alumina ratio. Most preferred is silica. The solid support may contain minor amounts, up to about 5000 parts per million on a weight basis, of additional elements not detrimentally affecting the catalytic activity of the supported catalyst, usually in the form of oxide.

The amount of hydroxyl groups of the support, if exceeding the desired quantity, can be reduced or eliminated by treating the support material either thermally or chemically. Thermally, the support material can be heated at temperatures of from about 250° C. to about 870° C., more preferably from about 600° C. to 800° C. for about 1 to about 24, preferably for about 2 to about 20, more preferably for about 3 to about 12 hours. The hydroxyl groups can also be removed chemically by treating the support material with SiCl$_4$, chlorosilanes, silylamines, aluminum alkyls and the like at a temperature of from about −20° C. to about 120° C., more preferably from about 0° C. to 40° C. for usually less than about 30 minutes.

Any amount of adsorbed water on the solid support should be substantially removed, i.e. to a level less than 0.05 g water per g support. This can be done by heating the support at temperatures from 150° to 250° C. for a sufficient amount of time.

A highly preferred silica solid support for use in the present invention is available from Grace Davison, a division of W.R. GRACE & CO-CONN., Baltimore, under the tradename Sylopol.

The solid support for use in the present invention can be prepared by any of the methods which involves an agglomeration step to produce an agglomerated support. Examples of such an agglomeration procedure are disclosed in U.S. Pat. No. 2,457,970 and U.S. Pat. No. 3,607,777, which are herein incorporated by reference. U.S. Pat. No. 2,457,970 describes a process by which a solution of silicic acid is sprayed to form the silica. U.S. Pat. No. 3,607,777 describes a process to form micro-spheroidal silica gel by spray drying a vigorously agitated slurry of a soft silica gel.

The supported catalyst component of the present invention further comprises a magnesium halide (B), preferably magnesium bromide or chloride, most preferably magnesium chloride.

The ratio of magnesium halide (B) to solid particulate support (A) is generally from 0.5 to 5.0 mmoles of (B) per gram of (A), preferably from 1.5 to 4.0 mmoles of (B) per gram of (A).

The supported catalyst component of the invention can be obtained by impregnating the solid particulate support (A) with a solution of the magnesium halide (B) or with a solution of a magnesium compound (B') which can be transformed into magnesium halide (B) by halogenation, followed, when a magnesium compound (B') is used, by halogenating the magnesium compound (B') to magnesium halide (B) with a halogenating agent (C), and optionally recovering the supported catalyst component.

Suitable magnesium halides (B) are magnesium dibromide or dichloride, most preferably magnesium dichloride. The magnesium halide is used as a solution in a polar solvent, such as for example water, alcohols, ethers, esters, aldehydes, or ketones. Preferred solvents are water, alcohols such as ethanol, and ethers such as tetrahydrofuran. Typically, the solid support is suspended in the solution of magnesium halide and agitated for a sufficient amount of time, generally for 2 to 12 hours. When a polar solvent is used care should be taken to substantially remove the polar solvent prior to adding components (D) or (E).

Preferably, the supported catalyst component is obtained by impregnating the solid support with a hydrocarbon soluble magnesium compound (B') of the formula $R_{2-x}MgX_n.xMR'_y$, wherein R independently each occurrence is a hydrocarbyl group having from 1 to 20 carbon atoms, X independently each occurrence is halo or hydrocarbyloxy with from 1 to 20 carbon atoms in the hydrocarbyl part thereof, n is from 0 to 2 with the proviso that if X is halo n is at most 1, M is aluminum, zinc or boron, R' independently each occurrence is hydrogen, hydrocarbyl or hydrocarbyloxy with from 1 to 20 carbon atoms in the hydrocarbyl part thereof, y has a value equal to the valence of M, and x has a value from 0 to 10. Using a hydrocarbon soluble magnesium compound allows the impregnation to occur in the same hydrocarbon solvent as may be used in the subsequent steps to prepare a catalyst component and catalyst. Hydrocarbon solvents can also be easily removed from the supported catalyst component and leave no deleterious residues should isolation of the catalyst component be desired. Impregnation with a magnesium halide requires the use of polar solvents such as water or tetrahydrofuran which require more rigorous procedures for removal prior to adding additional catalyst components. Also solvents such as tetrahydrofuran form a solvate with magnesium halide which cannot easily be removed by normal drying procedures and requires addition of additional amounts of a Group 13 hydrocarbyl compound to maintain high catalyst efficiency.

Hydrocarbon insoluble magnesium compounds can be rendered hydrocarbon soluble by combining the magnesium compound with a compound $MR'_y$ in an amount sufficient to render the resulting complex hydrocarbon soluble, which requires usually not more than about 10, preferably not more than about 6, more preferably not more than about 3 moles of $MR'_y$ per mole of magnesium compound.

More preferably, compound (B') is of the formula $R_{2-n}MgX_n.xMR'_y$ wherein R independently each occurrence is a hydrocarbyl group having from 1 to 10 carbon atoms, X independently each occurrence is hydrocarbyloxy with from 1 to 10 carbon atoms in the hydrocarbyl part thereof, n is from 0 to 2, M is aluminum or boron, R' independently each occurrence is hydrocarbyl with from 1 to 10 carbon atoms in the hydrocarbyl part thereof, y is 3, and x has a value from 0 to 6. Most preferred compounds $MR'_y$ are the trialkylaluminum compounds.

Examples of specific magnesium compounds (B') are diethylmagnesium, di-n-butylmagnesium, n-butyl-s-butylmagnesium, n-butylethylmagnesium, n-butyloctylmagnesium, n-butylmagnesium butoxide, ethylmagnesium butoxide, butylmagnesium ethoxide, octylmagnesium ethoxide, butylmagnesium i-propoxide, ethylmagnesium i-propoxide, butylmagnesium n-propoxide, ethylmagnesium n-propoxide, s-butylmagnesium butoxide, butylmagnesium 2,4-dimethyl-pent-3-oxide, n-butylmagnesium octoxide, s-butylmagnesium chloride, n-butylmagnesium chloride, ethylmagnesium chloride, butylmagnesium bromide, octylmagnesium chloride, ethylmagnesium bromide, and s-butylmagnesium bromide. Not all alkyl magnesium halide compounds are soluble and thus it may be necessary to employ a polar solvent, as described in relation to the magnesium halide solvents hereinbefore, in order to dissolve them. This is, however, not a preferred embodiment of the present invention.

Most preferably, the magnesium compound (B') is of the formula $R_2Mg.xMR'_y$, and R independently each occurrence is an alkyl group having from 2 to 8 carbon atoms, and M, R', x, and y are as defined previously. Highly preferred compounds (B') are selected from the group consisting of diethylmagnesium, n-butyl-s-butyl magnesium, n-butylethylmagnesium, and n-butyloctylmagnesium.

When the solid support is impregnated with a solution of a magnesium compound (B') which can be transformed into magnesium halide by halogenation, a halogenation step should follow. Halogenating agents (C) capable of halogenating magnesium compounds (B') include hydrogen halides, silicon halides of the formula $R'''_bSiX''_{4-b}$ wherein R''' is hydrogen or hydrocarbyl, X'' is halogen and b is 0, 1, 2 or 3, carboxylic acid halides, hydrocarbyl halides, boron halides, phosphorus pentachloride, thionyl chloride, sulfuryl chloride, phosgene, nitrosyl chloride, a halide of a mineral acid, chlorine, bromine, a chlorinated polysiloxane, a hydrocarbyl aluminum halide, aluminum trichloride and ammonium hexafluorosilicate.

Preferably, the halogenating agent (C) is selected from the group consisting of alkyl aluminum halides, advantageously alkyl aluminum sesqui- or dihalides, hydrogen halides, silicon halides, and boron halides. Preferably the halogenating agent is a chlorinating agent. Most preferably (C) is hydrogen chloride. High purity anhydrous hydrogen chloride is preferred which contains less than 10 parts per million oxygen and less than 5 parts per million water. Highly preferred in the practice of the present invention is the use of a dialkyl magnesium compound (B') in combination with a hydrogen halide, especially hydrogen chloride, halogenating agent (C). The by-product of the halogenation step is then an alkane or two alkanes which can be easily separated from the supported catalyst component as they are typically gasses. Magnesium compounds containing hydrocarbyloxy groups give alcohols as by-product which require a separate removal step. Other halogenating agents such as aluminum, boron or silicon halides leave aluminum, boron or silicon residues in the product. In addition, alkyl aluminum halides are strong reducing agents and their presence during the addition of component (D), as will be discussed hereinafter, can lead to reduction of component (D) in solution and not on the support. Reduction of component (D) in the solution is not desired as it may give less desirable bulk density and particle size properties to the polymer produced with such a catalyst. The use of hydrogen halide lowers these problems and does not increase the metal content of the eventual catalyst and thus polymer.

Although at lower amounts of (C) improvements can be obtained with respect to lower chloride residues in the catalyst and thus eventual polymer, preferably the amount of (C) is sufficient to convert substantially all of (B') to magnesium dihalide. With substantially all of (B') is meant, at least 90 mole percent of (B'), preferably at least 95 mole percent of (B') and most preferably at least 99 mole percent of (B'). If there is left too much alkyl magnesium when component (D) is added, this may lead to overreduction of component (D).

The supported catalyst component described above can be separated from the solvent or diluent and dried and stored for extended periods of time. At the desired moment this supported catalyst component can be combined with further catalyst components, as described hereinafter. According to a further aspect of the present invention, the supported catalyst component described above further comprises (D) a Group 4 or 5 transition metal compound. The Group 4 or 5 transition metal compound (D) employed in the present invention preferably is a halide, hydrocarbyloxide or mixed halide/hydrocarbyloxide of titanium, zirconium, hafnium, or vanadium.

Suitable Group 4 transition metal compounds are represented by the formula $MX_{4-a}(OR)_a$, wherein M is titanium, zirconium or hafnium, each R is independently an alkyl group having from 1 to about 20, preferably from about 1 to about 10, more preferably from 2 to about 8 carbon atoms; X is a halogen atom, preferably chlorine; and a has a value from 0 to 4. Particularly suitable titanium compounds include, for example, titanium tetrachloride, titanium tetraisopropoxide, titanium tetraethoxide, titanium tetrabutoxide, titanium triisopropoxide chloride, and combinations thereof. Analogous zirconium and hafnium compounds are also suitable.

Suitable Group 5 transition metal compounds preferably are vanadium compounds such as those represented by the formulas $VX_4$ and $V(O)X_3$, wherein each X is independently OR or a halide atom, preferably chloride, and, each R is independently an alkyl group having from 1 to about 20, preferably from about 2 to about 8, more preferably from about 2 to about 4, carbon atoms. Particularly suitable vanadium compounds include, vanadium tetrachloride, vanadium trichloride oxide, vanadium triethoxide oxide, and combinations thereof.

Mixtures of Group 4 and 5 transition metal compounds, preferably of titanium and vanadium, may be employed to control molecular weight and molecular weight distribution of the polymers produced. Most preferably (D) is titanium tetrachloride or zirconium tetrachloride. The mole ratio of (B) to (D) in the supported catalyst component is generally from about 1:1 to about 40:1 and preferably from 3:1 to 20:1.

According to the present invention, the supported catalyst component described above may further comprise (E) a Group 2 or 13 organometallic compound. Suitable examples of Group 13 compounds are represented by the formula $R_yMX_z$, wherein M is a Group 13 metal, preferably aluminum or boron, each R is independently an alkyl group having from 1 to about 20, preferably from about 1 to about 10, more preferably from about 2 to about 8 carbon atoms, X is a halogen atom, preferably chloro, y and z can each independently have a value from 1 to a value equal to the valence of M and the sum of y and z equals valence of M. More preferably (E) is an alkyl aluminum halide. Particularly suitable components (E) include ethyl aluminum dichloride, ethyl aluminum sesquichloride, diethyl aluminum chloride, isobutyl aluminum dichloride, diisobutyl aluminum chloride, octyl aluminum dichloride, and combinations thereof.

The mole ratio of (E) to (D) is preferably from 0.1:1 to 100:1, more preferably from 0.5:1 to 20:1, most preferably from 1:1 to 10:1.

Preferably the supported catalyst component of the present invention is obtained by impregnating the solid particulate support (A) with a solution of the magnesium halide (B) or with a solution of a magnesium compound (B') which can be transformed to magnesium halide (B) by halogenation; halogenating, when a magnesium compound (B') is used, the magnesium compound (B') to magnesium halide (B) with a halogenating agent (C); optionally recovering the supported catalyst component; combining the Group 4 or 5 transition metal compound (D) with the supported catalyst component; combining the product thus obtained with the Group 2 or 13 organometal compound (E); and, optionally, recovering the supported catalyst component.

In a highly preferred supported catalyst component, (A) is a solid silica support, (B) is magnesium dichloride, (D) is a halide, hydrocarbyloxide or mixed halide/hydrocarbyloxide of titanium, zirconium, hafnium, or vanadium, and (E) is an alkyl aluminum halide. Even more preferably in such a component, there is 0.5 to 5.0 mmole (B) per gram of the solid particulate support (A), (D) is titanium tetrachloride or zirconium tetrachloride or a mixture thereof, the mole ratio of (B) to (D) is from 1:1 to 40:1, (E) is an alkyl aluminum halide, and the mole ratio of (E) to (D) is from 0.1:1 to 100:1 mole (E) per mole of (D).

When it is desired to use the supported catalyst component in the preparation of olefin polymers having a high degree of stereospecificity, as additional component (F) an electron donor can be employed. Suitable electron donors are esters, ethers, ketones, lactones, and compounds containing N, P and/or S atoms.

According to a further aspect the present invention provides a process for preparing supported catalyst components described hereinbefore. Preferred embodiments for the components (A), (B), (B'), (C), (D), (E), and (F) used in the present process and their relative ratios have been described previously herein and these preferred embodiments are incorporated in the present process by reference.

Although the solid component (A) can be added to the other components in an appropriate medium, it is preferred to first slurry the solid support (A) in a hydrocarbon diluent. Suitable concentrations of solid support in the hydrocarbon medium range from about 0.1 to about 15, preferably from about 0.5 to about 10, more preferably from about 1 to about 7 weight percent.

The order of adding the other components (B), (B'), (C), (D), (E), and optionally (F) in appropriate liquid media, if desired, to the slurry of (A), or the slurry of (A) to the other components, is not critical, provided that if a dihydrocarbyl magnesium compound (B') is employed, the halogenating agent (C) is added to (B') prior to adding the transition metal compound (D). Adding (D) to a dihydrocarbyl magnesium compound (B) would result in premature reduction of component (D) which is preferably avoided.

Although the slurry of (A) can be combined with a magnesium halide (B) dissolved in a polar solvent, it is preferred to combine the slurry of (A) with the hydrocarbon soluble magnesium compound (B'), preferably dissolved in a hydrocarbon which may be the same or different from the hydrocarbon in which (A) is slurried. A contact time of usually about 0.1 to about 10, preferably from about 0.2 to about 8, and more preferably from about 0.5 to about 4 hours is sufficient for the purposes of the invention. In general 0.5 to 5.0 mmoles of (B) are employed per gram of (A), and preferably 1.5 to 4.0 mmoles of (B) per gram of (A). The concentration of (B') in the hydrocarbon is advantageously from 0.05 to 0.30M. In case a polar solvent is used, this is preferably removed prior to adding the other components. Typically, this can be done by evaporation or distillation.

Preferably, component (C) is added to the mixture of (A) and (B'), advantageously in a hydrocarbon medium. If component (C) under the reaction conditions is a gas or liquid, no further diluent or solvent is required. In case (c) is a solid, the same is preferably incorporated in a diluent or solvent. If (C) is a gas, it is preferably bubbled through the stirred mixture of (A) and (B'). Preferably the amount of (C) added is sufficient to convert substantially all of (B') to magnesium halide (B). The contact time should be sufficient to halogenate (B') to the desired extent. Usually the contact time is from about 0.1 to about 100, preferably from about 0.2 to about 20, more preferably from about 0.5 to about 10 hours.

At this point in the process the solvent or diluent can be separated by evaporation, filtration or decantation, and the resulting supported catalyst component consisting of the solid particulate support (A) with a magnesium halide (B) deposited thereon (also referred to as precursor composition) can be dried and stored prior to addition of the further optional components (D), (E), and (F). Alternatively, the further components can be added without this isolation step. The precursor composition is unstable in an atmosphere containing oxygen and moisture, and prior to adding any further component the oxygen and moisture should be carefully removed. Therefore, storage is preferably under an inert atmosphere, for example nitrogen.

The transition metal component (D), if solid then advantageously dissolved in a suitable hydrocarbon medium, is preferably combined with the precursor composition in a suitable hydrocarbon medium. Preferred hydrocarbons include aliphatic hydrocarbons such as pentane, hexane, heptane, octane and mixtures thereof. The contact time is usually from 0.1 to 100, preferably from 0.5 to 20, and more preferably from 1 to 10 hours. Two or more different transition metal compounds can be mixed together prior to their addition to the precursor composition. Component (D) is preferably added to give a mole ratio of (B) to (D) of from 1:1 to 40:1, and more preferably from 3:1 to 20:1. The concentration of (D) in the hydrocarbon is advantageously from 0.005 to 0.03M.

Component (E), preferably dissolved in a hydrocarbon medium, can be combined with the precursor composition, but is preferably added prior to or after addition of component (D). More preferably, (E) is added after (D). The contact time is typically from 1 to 100, preferably from 2 to 50, and more preferably from 5 to 20 hours. Component (E) is preferably added to give a mole ratio of (E) to (B) from 0.1:1 to 100:1, more preferably from 0.5:1 to 20:1, most preferably from 1:1 to 10:1. The concentration of (E) in the hydrocarbon is advantageously from 0.005 to 0.03M.

If desired an electron-donor component (F) can be added simultaneously with or after addition or formation of the magnesium compound (B).

Suitable hydrocarbon media which can be employed to slurry solid support (A) and which can serve as diluent or solvent for any of the other components employed in the present invention include, aliphatic hydrocarbons, aromatic hydrocarbons, naphthinic hydrocarbons, and combinations thereof. Particularly suitable hydrocarbons include, for example, pentane, isopentane, hexane, heptane, octane, isooctane, nonane, isononane, decane, cyclohexane, methylcyclohexane, toluene and combinations of two or more of such diluents.

The temperature employed in any step of the present process is generally from −20° C. to 120° C., preferably from 0° C. to 100° C., and most preferably from 20° to 70° C.

The above described process steps should be conducted under an inert atmosphere to exclude air (oxygen) and moisture as much as possible. Suitable inert gasses include nitrogen, argon, neon, methane and the like.

The supported catalyst component thus prepared can be employed, without separation or purification, in the polymerization of olefins as described hereinafter. Alternatively, the catalyst component can be stored in the hydrocarbon medium, or isolated from the hydrocarbon medium and dried and stored under inert conditions for an extended period of time, for example for one to several months.

According to a further aspect of the present invention there is provided an olefin polymerization supported catalyst composition comprising the catalyst component of the present invention containing components (A), (B), (D), (E) and, optionally, (F) as described herein in combination with a cocatalyst.

The catalyst components and compositions of the present invention can be advantageously employed in high pressure, solution, slurry and gas phase polymerization processes.

Suitable cocatalysts include, for example alumoxanes and compounds corresponding to the formula $R''_zGX''_{3-z}$, wherein G is aluminum or boron, R'' independently each occurence is hydrocarbyl, X'' independently each occurence is halide or hydrocarbyloxide, and z is a number from 1 to 3. Preferred compounds of this formula are those wherein z is 2 or 3, most preferably 3. Particularly suitable compounds include triethylaluminum, trimethylaluminum, triisobutylaluminum, trihexylaluminum, trioctylaluminum, diethylaluminum chloride, diethylaluminum ethoxide, and combinations of two or more of such compounds.

Suitable alumoxanes include those represented by the formula $(Al(O)R)_x$ wherein R is an alkyl group having from 1 to about 8 carbon atoms and x has a value greater than about 5. Particularly suitable alumoxanes include, for example, methylalumoxane, hexaisobutyltetraalumoxane, and combinations thereof. Also, mixtures of alumoxanes with alkylaluminum compounds such as, for example, triethylaluminum or tributylaluminum can be employed.

The cocatalyst can be employed in a suspension or suspension polymerization process in amounts which provide a ratio of atoms of aluminum or boron in the cocatalyst per atom of transition metal (D) on the supported catalyst component of from about 1:1 to about 1000:1, preferably from about 5:1 to about 500:1, more preferably from about 5:1 to about 200:1.

The cocatalyst can be employed in a solution or high pressure polymerization process in amounts which provide a ratio of atoms of aluminum or boron per atom of transition metal of from about 0.1:1 to about 50:1, preferably from about 1:1 to about 20:1, more preferably from about 2:1 to about 15:1.

In a slurry olefin polymerization process the solid support (A) generally has a median particle diameter from about 1 μm to about 200 μm, more preferably from about 5 μm to about 100 μm, and most preferably from about 20 μm to about 80 μm.

In a gas phase olefin polymerization process the solid support (A) preferably has a median particle diameter from about 20 μm to about 200 μm, more preferably from about 30 μm to about 150 μm, and most preferably from about 50 μm to about 100 μm.

In a solution and high pressure olefin polymerization process the solid support (A) preferably has a median particle diameter from about 1 μm to about 40 μm, more preferably from about 2 μm to about 30 μm, and most preferably from about 3 μm to about 20 μm.

Suitable olefins that can be polymerized in contact with the present catalyst composition include, for examples alpha-olefins having from 2 to about 20, preferably from about 2 to about 12, more preferably from about 2 to about 8 carbon atoms and combinations of two or more of such alpha-olefins. Particularly suitable alpha-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, or combinations thereof. Preferably, the alpha-olefins are ethylene, propene, 1-butene, 4-methyl-pentene-1, 1-hexene, 1-octene, and combinations of ethylene and/or propene with one or more of such other alpha-olefins.

A slurry process typically uses an inert hydrocarbon diluent and temperatures of from about 0° C. up to a temperature just below the temperature at which the resulting polymer becomes substantially soluble in the inert polymerization medium. Preferred temperatures are from about 60° C. to about 95° C. Pressures generally range from 1 to 100 bar. The solution process is carried out at temperatures from the temperature at which the resulting polymer is soluble in an inert solvent or the particular monomer up to about 275° C., preferably at temperatures of from about 130° C. to about 260° C., more preferably from about 150° C. to about 240° C. As inert solvents typically hydrocarbons and preferably aliphatic hydrocarbons are used. In solution processes the pressure is typically from 1 to 100 bar. Typical operating conditions for gas phase polymerizations are from 20° to 100° C., more preferably from 40° to 80° C. In gas phase processes the pressure is typically from subatmospheric to 100 bar. High pressure processes are carried out at temperatures from about 100° to about 400° C. and at pressures in the range of 500 to 3000 bar.

Having described the invention the following examples are provided as further illustration thereof and are not to be construed as limiting. Unless stated to the contrary all parts and percentages are expressed on a weight basis.

EXAMPLES

The solid supports (A) used in the following examples include a series of agglomerated silica gels available from Grace Davison under the trade name SYLOPOL with median particle sizes of 6, 12, 20, 45, and 70 μm as specified by the supplier (given the nomenclature 6A, 12A, 20A, 45A and 70A, respectively). In the Comparative Examples a series of granular silica gels available from Grace Davison also under the tradename SYLOPOL of 13, 26, and 41 μm median particle sizes was used as well as two other granular silicas Davison 952 and Davison Syloid 245, having respective particle sizes of 6 and 90 μm. The granular silicas were given the nomenclature 13G, 26G, 41G, 6G, and 90G, respectively. The properties of these solid supports are summarized in Table 1.

TABLE 1

|  | Average particle size (μ) | Hydroxyl content mmol/g | Surface area m²/g | Pore Volume cc/g | Texture |
| --- | --- | --- | --- | --- | --- |
| 6A | 5.8 | 2.2 | 315 | 1.56 | agglomerated |
| 12A | 13.2 | 2.1 | 268 | 1.67 | agglomerated |
| 20A | 19.6 | 2.0 | 305 | 1.66 | agglomerated |
| 45A | 45.0 | 2.0 | 255 | 1.50 | agglomerated |
| 70A | 70.0 | 2.0 | 259 | 1.50 | agglomerated |
| 6G | 6.0 | 2.3 | 400 | 1.50 | granular |
| 13G | 12.6 | 2.0 | 268 | 1.67 | granular |
| 26G | 26.0 | 2.0 | 271 | 1.70 | granular |
| 41G | 41.0 | 2.0 | 273 | 1.80 | granular |
| 90G | 90.0 | 1.1 | 350 | 1.50 | granular |

All the silicas used in the present Examples and Comparative Examples were dried at 750° C. under nitrogen in a fluidized bed, to obtain the surface hydroxyl contents as specified in Table 1.

The butyl ethyl magnesium compound (B') used was obtained from AKZO under the trade name Magala BEM, as a 15 weight % solution in heptane.

In the following examples, the flow rate for the melt index value, $I_2$, and for the value, $I_{10}$, are determined by ASTM D 1238 conditions E and N, respectively. The melt flow ratio, MFR, or $I_{10}/I_2$, is a dimensionless number derived by dividing the flow rate at Condition N by the flow rate at Condition E and is discussed in section 7.3 of ASTM D 1238. The apparent bulk density is determined as an unsettled bulk density according to the procedure of ASTM 1895 employing a paint volumeter from Sargent-Welch Scientific Company (Catalog No. S-64985) as the cylinder instead of the one specified by the ASTM procedure. Polymer particles size is determined by sieving the powder through two sets of U.S.A. Standard Testing Sieves meeting ASTME-11 criteria. To approximately 100 grams of polymer is added 0.1 gram of definely divided carbon black and the mixture is then sieved through number 20, 30, 35, 40 and 60 sieves corresponding to 850, 600, 500, 425 and 250 micron openings, respectively. The weight of the material remaining on the sieves is then measured by difference and the material that passed through the number 60 sieve is further sieved through number 80, 100, 140, and 200 sieves, which correspond to 180, 150, 106 and 75 micron openings, respectively. The percentage of the material passing through each sive is then calculated and plotted on logarithmic probability paper with the sieve size on the Y-axis. The average size of the powder as measured by weight is determined by the intersection of the best fit curve through the points with the 50% probability line. A standard reference for particle size measurement is Particle Size: Measurement, Interpretation and Application by Riyad R. Irani and Clayton F. Callis, John Wiley & Sons, Inc., New York, 1963. In each of the following examples and comparative experiments, unless otherwise stated, the catalyst components are blended at ambient temperature in a dry, oxygen free atmosphere.

In the slurry polymerization experiments, unless indicated otherwise, a stirred 5 l autoclave reactor is charged with about 1850 g of anhydrous hexane and the vapor space swept with hydrogen prior to heating to 85° C. Hydrogen is added up to a pressure of 85 psig (585 kPa) followed by ethylene sufficient to bring the total pressure to 175 psig (1205 kPa). The ethylene is supplied continuously to the reactor by a demand feed regulator. The required amount of supported catalyst component is premixed with cocatalyst to give the desired cocatalyst to supported catalyst component mole ratio. The resulting catalyst mixture is added to the reactor to initiate the polymerization. After 45 minutes the ethylene feed is stopped and the reactor vented and cooled and the polymer filtered and dried at 80° C. overnight in a vacuum oven. After drying, the polymer is weighed to calculate the catalyst efficiency. The polymer samples are stabilized and subsequently melt flow, melt flow ratio, particle size and bulk density were determined where applicable.

Examples 1-4

15 g of solid support 12A is slurried in 250 ml of hexane. Butylethylmagnesium (BEM) (30 mmol) is added to the stirred suspension and the mixture is stirred for two hours. Anhydrous HCl (60 mmol) is bubbled through the suspension for 15 min followed by nitrogen to remove any excess HCl. The suspension is slowly evaporated under vacuum at room temperature for twelve hours to leave a dry free flowing powder. 1.31 g of this solid is resuspended under nitrogen in 74 ml of hexane to which is added 0.38 g of a 10% solution of titanium tetrachloride (TTC) in hexane. The slurry is stirred for twelve hours followed by addition of 0.66 ml of 1.50M diethylaluminum chloride (DEAC) in heptane followed by further stirring for 24 hr. Prior to polymerization a hexane solution of triisobutylaluminum (TiBAl) cocatalyst (0.15M in hexane) is added to give a TiBAl/Ti mole ratio of 150:1.

In Example 2, Example 1 is repeated but now 1.33 ml of 1.50M DEAC in heptane is added.

In Example 3, Example 1 is repeated but now 2.00 ml of 1.50M DEAC in heptane is added.

In Example 4, Example 1 is repeated but now no drying step is used after the HCl addition with all the reagents being added sequentially to the vessel.

The results are given in Table 2. The symbols $E_{Ti}$, $E_{Al}$, and $E_{Cl}$ are the efficiencies of the catalyst expressed as $10^6$ g polymer per g of Ti, Al, and Cl, respectively.

TABLE 2

| | Support | BEM/Silica mmol/g | HCl/BEM mol/mol | Mg/Ti mol/mol | DEAC/Ti mol/mol |
|---|---|---|---|---|---|
| Ex 1 | 12A | 2.0 | 2.7 | 10.0 | 5 |
| Ex 2 | 12A | 2.0 | 2.7 | 10.0 | 10 |
| Ex 3 | 12A | 2.0 | 2.7 | 10.0 | 15 |
| Ex 4 | 12A | 2.0 | 2.7 | 10.0 | 5 |

| | $E_{Ti}$ | $E_{Al}$ | $E_{Cl}$ | $I_2$ (g/10 m) | $I_{10}/I_2$ Ratio | Bulk Dens. lb/ft$^3$ (Kg/m$^3$) | Polymer Particle Size (μ) |
|---|---|---|---|---|---|---|---|
| Ex 1 | 1.27 | 0.014 | 0.048 | 1.21 | 9.63 | 22.0 (352) | 159 |
| Ex 2 | 0.93 | 0.010 | 0.031 | 1.66 | 9.42 | 21.0 (336) | 172 |
| Ex 3 | 1.06 | 0.011 | 0.033 | 1.51 | 9.53 | 22.0 (352) | 175 |
| Ex 4 | 1.12 | 0.012 | 0.042 | 1.47 | 8.86 | 18.3 (293) | 173 |

Examples 5-9

Example 1 is repeated, using the TiBAl cocatalyst/titanium ratios specified in Table 3. The results are given in the same Table.

TABLE 3

| Ex | TiBAl/Ti [mole/mole] | $E_{Ti}$ | $E_{Al}$ | $E_{Cl}$ |
|---|---|---|---|---|
| 5 | 25 | 0.62 | 0.037 | 0.023 |
| 6 | 50 | 0.67 | 0.022 | 0.025 |
| 7 | 75 | 0.70 | 0.015 | 0.026 |
| 8 | 100 | 0.94 | 0.016 | 0.034 |
| 9 | 150 | 0.89 | 0.010 | 0.033 |

| Ex | $I_2$ (g/10 m) | $I_{10}/I_2$ Ratio | Bulk Dens lb/ft$^3$ (Kg/m$^3$) | Polymer Particle Size (μ) |
|---|---|---|---|---|
| 5 | 0.84 | 9.86 | 23.1 (370) | 163 |
| 6 | 1.09 | 9.83 | 22.7 (363) | 177 |
| 7 | 1.14 | 9.83 | 22.7 (363) | 171 |
| 8 | 1.30 | 9.58 | 22.4 (358) | 174 |
| 9 | 1.66 | 9.38 | 21.3 (341) | 179 |

Examples 10-12

In Example 10, 18 g of solid support 6A is slurried in 500 ml of Isopar™ E (available from Exxon Chemical). BEM (36 mmol) is added to the stirred suspension and the reaction mixture is stirred for two hours. Then anhydrous HCl is bubbled through the suspension until an aliquot of the slurry hydrolyzed in water gave a neutral pH. The slurry is purged with nitrogen for 10 min to remove any excess HCl. To 178 ml of this solution is added 2.30 g of a 10 wt % solution of titanium tetrachloride in Isopar E. The resulting mixture is stirred for twelve hours followed by addition of 8 ml of a 1.50M DEAC in heptane. Further stirring takes place for 24 hr. Prior to polymerization TiBAl cocatalyst (0.15M in hexane) is added to give a TiBal/Ti mole ratio of 100:1.

In Example 11, 15 g of solid support 12A is slurried in 333 mls of Isopar E. BEM (30 mmol) is added to the stirred suspension and the suspension is stirred for two hours. Anhydrous HCl is then bubbled through the suspension until an aliquot of the slurry hydrolyzed in water gave a neutral pH. The slurry is subsequently purged with nitrogen for 10 min to remove any excess HCl. To 132 ml of this solution is added 1.15 g of a 10 wt % solution of titanium tetrachloride in Isopar E. The slurry is then stirred for twelve hours followed by addition of 4 ml of 1.50M DEAC in heptane. The mixture is stirred for another 24 hr. Prior to polymerization TiBAl cocatalyst (0.15M in hexane) is added to give a TiBAl/Ti mole ratio of 100.

In Example 12, 18 g of solid support 20A is slurried in 500 ml of Isopar E. BEM (36 mmol) is added to the stirred suspension and the mixture is stirred for two hours. Anhydrous HCl is then bubbled through the suspension until an aliquot of the slurry hydrolyzed in water gave a neutral pH. The slurry is then purged with nitrogen for 10 min to remove any excess HCl. To 178 ml of this solution is added 2.30 g of a 10 wt % solution of titanium tetrachloride in Isopar E. Then the slurry is stirred for twelve hours followed by the addition of 8 ml of 1.50M DEAC in heptane followed by further stirring for 24 hr. Prior to polymerization TiBAl cocatalyst (0.15M in hexane) is added to give a TiBAl/Ti mole ratio of 100.

TABLE 4

| Ex | Support | BEM/silica [mmol/g] | HCl/BEM [mol/mol] | Mg/Ti [mol/mol] | DEAC/Ti [mol/mol] |
|---|---|---|---|---|---|
| 10 | 6A | 2.0 | 2.0 | 10.0 | 10.0 |
| 11 | 12A | 2.0 | 2.0 | 10.0 | 10.0 |
| 12 | 20A | 2.0 | 2.0 | 10.0 | 10.0 |

| Ex | $E_{Ti}$ | $E_{Al}$ | $E_{Cl}$ | $I_2$ (g/10 m) | $I_{10}/I_2$ Ratio | Bulk Dens lb/ft$^3$ (Kg/m$^3$) | Polymer Particle Size (μ) |
|---|---|---|---|---|---|---|---|
| 10 | 1.69 | 0.018 | 0.056 | 1.83 | 8.86 | 20.7 (331) | 109 |
| 11 | 0.98 | 0.010 | 0.033 | 1.72 | 8.95 | 19.7 (315) | 156 |
| 12 | 0.60 | 0.006 | 0.020 | 2.08 | 9.33 | 23.8 (381) | 251 |

Examples 13–18

In Example 13 Example 1 is repeated except that now 0.66 ml of 1.50M ethylaluminum dichloride (EADC) in heptane is used instead of DEAC. In Example 14 Example 1 is repeated except that now 1.33 ml of 1.50M EADC in heptane is used instead of DEAC.

In Example 15 Example 1 is repeated except that now 1.98 ml of 1.50M EADC in heptane is used instead of DEAC.

In Example 16, 15 g of solid support 45A is slurried in 250 ml of hexane. BEM (30 mmol) is added to the stirred suspension followed by stirring for two hours. Anhydrous HCl is then bubbled through the suspension for 30 min followed by nitrogen to remove any excess HCl. The suspension is subsequently slowly evaporated under vacuum at room temperature for twelve hours to leave a dry free flowing powder. A 1.30 g sample of this solid is resuspended under nitrogen in 74 ml of hexane to which is added 0.38 g of a 10 wt % solution of titanium tetrachloride in hexane. The slurry is stirred for twelve hours followed by the addition of 0.66 mls of 1.50M EADC in heptane. This mixture is stirred for 24 hrs. Prior to polymerization TiBAl cocatalyst (0.15M in hexane) is added to give a TiBAl/Ti mole ratio of 150:1.

In Example 17, Example 16 is repeated except that 1.33 ml of 1.50M EADC in heptane is added.

In Example 18, Example 16 is repeated except that 1.98 ml of 1.50M EADC in heptane is added.

TABLE 5

| Ex | Support | BEM/silica [mmol/g] | HCl/BEM [mol/mol] | Mg/Ti [mol/mol] |
|---|---|---|---|---|
| 13 | 12A | 2.0 | 2.7 | 10.0 |
| 14 | 12A | 2.0 | 2.7 | 10.0 |
| 15 | 12A | 2.0 | 2.7 | 10.0 |
| 16 | 45A | 2.0 | 2.7 | 10.0 |
| 17 | 45A | 2.0 | 2.7 | 10.0 |
| 18 | 45A | 2.0 | 2.7 | 10.0 |

| Ex | EADC/Ti (mol/mol) | $E_{Ti}$ | $I_2$ (g/10 m) | $I_{10}/I_2$ Ratio | Bulk Dens. lb/ft$^3$ (Kg/m$^3$) | Polymer Particle Size (μ) |
|---|---|---|---|---|---|---|
| 13 | 5.0 | 0.67 | 0.87 | 8.67 | 22.7 (363) | 155 |
| 14 | 10.0 | 0.57 | 0.51 | 9.72 | 19.4 (310) | 156 |
| 15 | 15.0 | 0.58 | 0.47 | 10.04 | 18.1 (290) | 156 |
| 16 | 5.0 | 0.44 | 1.70 | 9.88 | 21.1 (338) | 266 |
| 17 | 10.0 | 0.58 | 0.71 | 10.34 | 20.5 (328) | 280 |
| 18 | 15.0 | 0.36 | 0.48 | 10.64 | 17.7 (283) | 290 |

Examples 19–22

In Examples 19–22, four suspensions, each containing 18 g of solid support 12A slurried in 500 ml of Isopar E are prepared. BEM (36 mmol) is added to the stirred suspension and the mixture is stirred for two hours. Anhydrous HCl is then bubbled through the suspension for respectively, 30, 35, 40 and 45 minutes followed by nitrogen purge for 10 minutes. Analysis of the slurry at this point for chloride and magnesium concentrations gave a Cl:Mg molar ratio of 1.66, 1.97, 2.00, and 2.26. To a sample of 400 ml of the slurry is then added 0.46 g of titanium tetrachloride in 10 ml of Isopar E. The slurry is stirred for 24 hours followed by the addition of 16.3 ml of 1.50M DEAC in heptane followed by further stirring for 24 hours. Prior to polymerization TiBAl cocatalyst (0.15M in hexane) is added to give a TiBAl/Ti mole ratio of 100.

TABLE 6

| Ex | Support 1 | HCl Time (min) | BEM/silica [mmol/g] | Cl/Mg Ratio | Mg/Ti [mol/mol] |
|---|---|---|---|---|---|
| 19 | 12A | 30 | 2.0 | 1.66 | 10.0 |
| 20 | 12A | 35 | 2.0 | 1.97 | 10.0 |
| 21 | 12A | 40 | 2.0 | 2.00 | 10.0 |
| 22 | 12A | 45 | 2.0 | 2.26 | 10.0 |

| Ex | DEAC/Ti (mol/mol) | $E_{ti}$ | $I_2$ (g/10 m) | $I_{10}/I_2$ Ratio | Bulk Dens lb/ft$^3$ (Kg/m$^3$) | Polymer Particle Size (μ) |
|---|---|---|---|---|---|---|
| 19 | 10.0 | 0.885 | 1.54 | 9.10 | 19.3 (309) | 171 |
| 20 | 10.0 | 0.935 | 1.95 | 9.18 | 19.3 (309) | 166 |
| 21 | 10.0 | 0.850 | 1.60 | 9.13 | 19.2 (307) | 172 |
| 22 | 10.0 | 0.609 | 0.79 | 9.93 | 21.7 (347) | 157 |

Comparative Examples 1–15

In Comparative Examples 1–4, 5 g of solid support 6G is slurried in 250 ml of hexane. BEM (10 mmol) is added to the stirred suspension and the suspension is stirred for two hours. Anhydrous HCl is then bubbled through the suspension for 30 min followed by nitrogen to remove any excess HCl. The suspension is subsequently slowly evaporated under vacuum at room temperature for twelve hours to leave a dry free flowing powder. The solid is resuspended under nitrogen in 250 ml of hexane and 1.7 g of a 10 wt % solution of titanium tetrachloride in hexane is added followed by further stirring for 24 hours. A 50 ml aliquot of this slurry is taken and 2, 3, 4, and 5 ml respectively of 1.0M EADC in hexane is added to the sample which is stirred for 24 hours. Prior to polymerization TiBAl cocatalyst (0.15M in hexane) is added to give a TiBAl/Ti mole ratio of 150.

In Comparative Examples 5–8, Comparative Examples 1–4 are repeated except that after HCl addition no drying step is carried out.

In Comparative Example 9, 5 g of solid support 13G is slurried in 500 ml of Isopar E. BEM (10 mmol) is added to the stirred suspension and the reaction mixture is stirred for two hours. Then anhydrous HCl is bubbled through the suspension until an aliquot of the slurry hydrolyzed in water give a neutral pH. The slurry is purged with nitrogen for 10 minutes to remove any excess HCl. To this slurry is added 110 μl of titanium tetrachloride. The resulting mixture is stirred for twelve hours followed by the addition of 6.7 ml of a 1.50M solution of DEAC in heptane. Further stirring takes place for 24 hr. Prior to polymerization, TiBAL cocatalyst (0.15M in hexane) is added to give a TiBAL/Ti mole ratio of 100:1.

In Comparative Example 10, Comparative Example 9 is repeated except that now 5 g of solid support 30G is used instead of 5 g of 13G.

In Comparative Example 11, Comparative Example 9 is repeated except that now 5 g of solid support 45G is used instead of 5 g of 13G.

In Comparative Examples 12–15, Comparative Examples 5–8 are repeated except that instead of solid support 6G is now used solid support 90G. The results of Comparative Examples 1–15 are summarized in Table 7.

TABLE 7

| Comp. Ex | Support | BEM/silica [mmol/g] | HCl/BEM [mol/mol] | Mg/Ti [mol/mol] |
|---|---|---|---|---|
| 1 | 6G | 2.0 | 2.7 | 10.0 |
| 2 | 6G | 2.0 | 2.7 | 10.0 |
| 3 | 6G | 2.0 | 2.7 | 10.0 |
| 4 | 6G | 2.0 | 2.7 | 10.0 |
| 5 | 6G | 2.0 | 2.7 | 10.0 |
| 6 | 6G | 2.0 | 2.7 | 10.0 |
| 7 | 6G | 2.0 | 2.7 | 10.0 |
| 8 | 6G | 2.0 | 2.7 | 10.0 |
| 9 | 13G | 2.0 | 2.0 | 10.0 |
| 10 | 30G | 2.0 | 2.0 | 10.0 |
| 11 | 45G | 2.0 | 2.0 | 10.0 |
| 12 | 90G | 2.0 | 2.7 | 10.0 |
| 13 | 90G | 2.0 | 2.7 | 10.0 |
| 14 | 90G | 2.0 | 2.7 | 10.0 |
| 15 | 90G | 2.0 | 2.7 | 10.0 |

| Comp. Ex | DEAC/Ti (mol/mol) | $E_{Ti}$ | $I_2$ (g/10 m) | $I_{10}/I_2$ Ratio | Bulk Dens lb/ft³ (Kg/m³) | Polymer Particle Size (μ) |
|---|---|---|---|---|---|---|
| 1 | 10 | 0.831 | 0.21 | 14.67 | 16.3 (261) | 107 |
| 2 | 15 | 0.737 | 0.12 | 16.70 | 15.8 (253) | 102 |
| 3 | 20 | 0.727 | 0.12 | 16.62 | 15.1 (242) | 96 |
| 4 | 25 | 0.483 | 0.11 | 15.62 | 12.5 (200) | 122 |
| 5 | 10 | 0.524 | 0.22 | 13.41 | 13.7 (219) | 112 |
| 6 | 15 | 0.781 | 0.10 | 19.43 | 15.3 (215) | 103 |
| 7 | 20 | 0.662 | 0.05 | 25.32 | 15.5 (248) | 109 |
| 8 | 25 | 0.463 | 0.07 | 24.6 | 14.4 (230) | 108 |
| 9 | 10 | 0.27 | 5.77 | 8.45 | 14.6 (234) | 91 |
| 10 | 10 | 0.19 | 4.04 | 8.51 | 15.3 (245) | 114 |
| 11 | 10 | 0.19 | 5.83 | 8.89 | 14.8 (237) | 111 |
| 12 | 10 | 0.208 | 0.08 | 18.18 | 13.6 (218) | 304 |
| 13 | 15 | 0.241 | 0.09 | 17.83 | 14.6 (234) | 275 |
| 14 | 20 | 0.197 | 0.10 | 18.71 | 13.8 (221) | 216 |
| 15 | 25 | 0.246 | 0.16 | 16.62 | 14.5 (232) | 115 |

Example 23

To 153.4 kg of anhydrous heptane stirred under ambient pressure and a nitrogen atmosphere is added 28.1 kg of a solid support 12A. To the slurry is then added 42.0 kg of a 14.7 wt % solution of BEM in heptane. The slurry is stirred for three hours followed by the addition of 3.96 kg of anhydrous hydrogen chloride. The heptane is then removed to leave a free flowing powder with a magnesium concentration of 1.64 mmol/g support and a Cl:Mg mole ratio of 1.96. 64.5 kg of this support is added to 726 kg of isopentane stirred under ambient pressure and a nitrogen atmosphere. This mixture is stirred for 30 min followed by the addition of 2.58 kg of neat titanium tetrachloride via a pressurized stainless steel addition cylinder. The resulting slurry is stirred for a further seven hours followed by the addition of 136 kg of 12.1 wt % solution of DEAC in hexane to yield a catalyst with a Mg:Ti:Al mole ratio of 2.0:0.25:2.5. After stirring for a further nine hours the slurry is mixed with 8 molar equivalents of TiBAl cocatalyst with respect to the titanium component. The resulting slurry is pumped directly to a continuous process reactor in which the polymerization of ethylene takes place at a temperature of 85° C. and a pressure of 1205 kPa. The titanium efficiency is $0.6 \times 10^6$ g polymer/g Ti.

Examples 24–27

In Examples 24–27, 11 g of solid support 6A is slurried in 531 ml of Isopar E. BEM (22.3 ml of 0.982M in heptane; 21.92 mmol) is added to the stirred suspension and the slurry is stirred for two hours. Anhydrous HCl is then bubbled through the suspension until an aliquot of the slurry hydrolyzed in water gives neutral pH. The slurry is subsequently purged with nitrogen for 10 min to remove any excess HCl. To 50.5 ml of this slurry is added 6.6 ml of a solution made by mixing 5.5 ml of an equimolar mixture of titanium terachloride and vanadium oxytrichloride and 94.5 ml of Isopar E. The slurry is stirred for twelve hours followed by the addition of 2.0, 3.3, 4.7, and 6.0 ml, respectively, of 1.50M solution DEAC in heptane followed by further stirring for 96 hr. The Mg/Ti/V/Al molar ratio is 2/1.8/1.8/3 (Ex 24); 2/1.8/1.8/5 (Ex 25); 2/1.8/1.8/7 (Ex. 26); and 2/1.8/1.8/9 (Ex 27), and the DEAC content is 3, 5, 7, and 9 mmol/g $SiO_2$, respectively. Prior to polymerization triethyl aluminum (TEA) cocatalyst (0.15M is Isopar E) is added to give a TEA/Ti mole ratio of 9:1.

A one gallon (3.79 l) autoclave reactor is charged with two liters of Isopar E and an amount of 1-octene such that its molar concentration in the reactor is 0.99M. The reactor is heated to 185° C. and 2 psig (14 kPa) of hydrogen is added to the reactor followed by ethylene sufficient to bring the total pressure to 450 psig (3100 kPa). Then 6 μmol Ti equivalents of the catalyst prepared as described herebefore is injected into the reactor. The reactor temperature and pressure are maintained constant by continually feeding ethylene during the polymerization and cooling the reactor as required. After 10 min the ethylene is shut off and the hot solution transferred into a nitrogen purged resin kettle. After drying the samples are weighed to determine catalyst efficiencies followed by melt flow measurements. The results are given in Table 8.

TABLE 8

| Ex | DEAC/Ti Ratio | $E_{Ti}$ | $I_2$ (g/10 m) | $I_{10}/I_2$ Ratio |
|---|---|---|---|---|
| 24 | 3.0 | 0.24 | 7.59 | 7.01 |
| 25 | 5.0 | 0.53 | 6.13 | 6.82 |
| 26 | 7.0 | 0.47 | 5.66 | 6.73 |
| 27 | 9.0 | 0.47 | — | — |

Examples 29–32

Example 26 is repeated, but now the TEA/Ti mole ratio is varied. The results are given in Table 9.

TABLE 9

| Ex | TEA/Ti Ratio | $E_{ti}$ | $I_2$ (g/10 m) | $I_{10}/I_2$ Ratio |
|----|------|------|------|------|
| 28 | 2.5  | 0.40 | 4.32 | 6.73 |
| 29 | 5.0  | 0.59 | 6.59 | 6.70 |
| 30 | 9.2  | 0.47 | 5.66 | 6.73 |
| 31 | 12.9 | 0.51 | 6.33 | 6.74 |

Example 33

The void fraction of three different granular solid supports and three different agglomerated solid supports are determined according to the procedure described herebefore. The results are summarized in Table 10.

TABLE 10

| Support | Void Fraction (%) |
|---------|-------------------|
| 6G  | no voids |
| 45G | no voids |
| 70G | no voids |
| 6A  | 13.48 |
| 45A | 15.51 |
| 70A | 20.32 |

What is claimed is:

1. An olefin polymerization supported catalyst composition comprising (I) a supported catalyst component consisting essentially of (A) a solid particulate support having
   (i) a specific surface area of from 100 to 1000 m²/g;
   (ii) a surface hydroxyl content of from 0.5 to not more than 5 mmol hydroxyl groups per g of solid support;
   (iii) a pore volume of from 0.3 to 3.0 cc/g;
   (iv) a median particle size of 1 to 200 μm; and
   (v) a majority of particles of the solid particulate support in the form of an agglomerate of subparticles;

(B) a magnesium halide;
   (D) a Group 4 or 5 transition metal compound;
   (E) a Group 2 or 13 organometal compound; and (II) a cocatalyst selected from the group consisting of alumoxanes and compounds corresponding to the formula $R''_zGX''_{3-z}$, wherein G is aluminum or boron, R'' independently each occurrence is hydrocarbyl, X'' independently each occurrence is halide or hydrocarbyloxide, and z is a number from 1 to 3.

2. A supported catalyst component consisting essentially of (A) solid particulate support having
   (i) a specific surface area of from 100 to 1000 m²/g;
   (ii) a surface hydroxyl content of from 0.5 to not more than 5 mmol hydroxyl groups per g of solid support;
   (iii) a pore volume of from 0.3 to 3.0 cc/g;
   (iv) a median particle size of 1 to 200 μm; and
   (v) a majority of particles of the solid particulate support in the form of an agglomerate of subparticles; and (B) a magnesium dihalide.

3. The supported catalyst component of claim 2 wherein (A)(v) at least 70 percent by weight of the solid particulate support is in the form of an agglomerate of subparticles.

4. The supported catalyst component according to claim 2 wherein the solid particulate support (A) has (i) a specific surface area of from 200 to 600 m²/g, (ii) a surface hydroxyl content of from 0.5 to not more than 3 mmol hydroxyl groups per g of solid support, (iii) a pore volume of from 0.5 to 2.5 cc/g, (iv) a median particle size of 3 to 150 μm.

5. The supported catalyst component according to claim 2 wherein the solid particulate support (A) is silica.

6. The supported catalyst component according to claim 2 wherein the magnesium dihalide (B) is magnesium chloride.

7. The supported catalyst component according to claim 2 wherein the ratio of magnesium dihalide (B) to solid particulate support (A) is from 0.5 to 5.0 mmoles of (B) per gram of (A).

* * * * *